United States Patent
Mikoshiba (10) Patent No.: US 11,212,594 B2
(45) Date of Patent: Dec. 28, 2021

(54) SERVER DEVICE AND STORAGE MEDIUM FOR USE THEREWITH

(71) Applicant: KONAMI DIGITAL ENTERTAINMENT CO., LTD., Tokyo (JP)

(72) Inventor: Eiri Mikoshiba, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 16/662,354

(22) Filed: Oct. 24, 2019

(65) Prior Publication Data

US 2020/0059704 A1  Feb. 20, 2020

Related U.S. Application Data

(63) Continuation of application No. PCT/JP2018/016210, filed on Apr. 19, 2018.

(30) Foreign Application Priority Data

Apr. 28, 2017  (JP) .............................. JP2017-090033

(51) Int. Cl.
*H04N 21/81* (2011.01)
*A63F 13/35* (2014.01)
(Continued)

(52) U.S. Cl.
CPC ......... *H04N 21/8153* (2013.01); *A63F 13/35* (2014.09); *A63F 13/87* (2014.09); *H04N 21/4788* (2013.01); *H04N 21/845* (2013.01)

(58) Field of Classification Search
CPC ........... H04N 21/8153; H04N 21/4788; H04N 21/845; H04N 1/00408; H04N 21/84;
(Continued)

(56) References Cited

U.S. PATENT DOCUMENTS 10,410,180 B2 * 9/2019 Druck ................. G06F 3/04817
2011/0164163 A1 * 7/2011 Bilbrey .................. H04N 5/222
348/333.01
(Continued)

FOREIGN PATENT DOCUMENTS

CN  103634690 A  3/2014
CN  104185079 A  12/2014
(Continued)

OTHER PUBLICATIONS

International Search Report for PCT/JP2018/016210 dated Jul. 17, 2018 [PCT/ISA/210].
(Continued)

*Primary Examiner* — Hung Q Dang
(74) *Attorney, Agent, or Firm* — Sughrue Mion, PLLC (57) ABSTRACT

Provided is a server device that is capable of making it easy to attach comments to videos while reflecting the individuality of various users. A center server, when a user terminal is connected, delivers video data according to a request by the user terminal. The center server also specifies a stamp selected by each user among a plurality of stamps that have been prepared in advance, and, on the basis of symbol data for managing symbols that are separately set for users in order to visually identify each user, specifies the symbol of the user who has selected the stamp. The center server, when a request is made for delivery the video data, provides the user terminal with information about the stamp and the symbol so that a comment icon in which the selected stamp and the symbol of the user are combined is attached to the video.

10 Claims, 8 Drawing Sheets

(51) Int. Cl.
*A63F 13/87* (2014.01)
*H04N 21/4788* (2011.01)
*H04N 21/845* (2011.01)
*A63F 13/86* (2014.01)
*A63F 13/31* (2014.01)
*H04N 21/472* (2011.01)
*H04N 21/488* (2011.01)
*H04N 21/84* (2011.01)
*H04N 21/235* (2011.01)
*G06F 3/0481* (2013.01)
*G06F 3/14* (2006.01)
*G06F 13/00* (2006.01)
*G06F 3/0484* (2013.01)
*H04N 21/458* (2011.01)
*H04N 21/431* (2011.01)

(58) Field of Classification Search
CPC ........... H04N 21/2353; H04N 21/4882; H04N 21/47205; H04L 51/046; A63F 13/87; A63F 13/35; A63F 13/31; A63F 13/86; G06F 3/14; G06F 3/0481; G06F 13/00
USPC ........................................... 386/241; 715/810
See application file for complete search history.

(56) References Cited

U.S. PATENT DOCUMENTS

| | | | | |
|---|---|---|---|---|
| 2011/0244954 A1* | 10/2011 | Goldman | ................. | A63F 13/53 463/30 |
| 2012/0151346 A1* | 6/2012 | McClements, IV | ... | G11B 27/34 715/716 |
| 2012/0290977 A1* | 11/2012 | Devecka | ................. | G06Q 10/10 715/810 |
| 2014/0215512 A1* | 7/2014 | Maruyama | ....... | H04N 21/44008 725/34 |
| 2016/0182971 A1* | 6/2016 | Ortiz | ................. | H04N 21/42224 725/34 |
| 2016/0323443 A1* | 11/2016 | Duckworth | ............. | G06T 11/60 |
| 2016/0352667 A1* | 12/2016 | Pickett | .................... | H04L 67/22 |
| 2018/0095616 A1* | 4/2018 | Valdivia | ................... | H04L 51/24 |
| 2018/0189958 A1* | 7/2018 | Budagavi | .................. | G06T 7/20 |
| 2018/0197008 A1* | 7/2018 | Greenberger | ............ | G06F 3/147 |
| 2019/0009178 A1* | 1/2019 | Nakagawa | ........... | H04N 21/234 |
| 2020/0322688 A1* | 10/2020 | Lehtiniemi | ............ | G06Q 50/01 |

FOREIGN PATENT DOCUMENTS

| | | |
|---|---|---|
| JP | 2008-245948 A | 10/2008 |
| JP | 2011-212296 A | 10/2011 |
| JP | 2013-229873 A | 11/2013 |
| JP | 2014-7598 A | 1/2014 |
| JP | 2015-142207 A | 8/2015 |
| JP | 2016-72651 A | 5/2016 |

OTHER PUBLICATIONS

Written Opinion of the International Searching Authority for PCT/JP2018/016210 dated Jul. 17, 2018 [PCT/ISA/237].
Notice of Reasons for Refusal dated Oct. 4, 2017 from Japanese Patent Office in counterpart JP Application No. 2017-090033.
Decision to Grant a Patent dated Jan. 29, 2018 from Japanese Patent Office in counterpart JP Application No. 2017-090033.
Notification of Reason for Refusal dated Jan. 7, 2021 from the Korean Intellectual Property Office in KR Application No. 10-2019-7031598.
Communication dated Jul. 2, 2021, from the Korean Patent Office in application No. 1020197031598.
The first Office Action dated May 7, 2021 from the China National Intellectual Property Administration in CN Application No. 201880027745.3.

* cited by examiner

SERVER DEVICE AND STORAGE MEDIUM FOR USE THEREWITH

TECHNICAL FIELD

The present invention relates to a server device and so on including a video data storage unit that stores video data for displaying videos, and that, when video display terminals that display videos on the basis of video data are connected thereto via a network, delivers video data to the video display terminals according to requests from the video display terminals.

BACKGROUND ART

There is a server device including a video data storage unit that stores video data for displaying videos, and that, when video display terminals that display videos on the basis of video data are connected thereto via a network, delivers video data to the video display terminals according to requests from the video display terminals. For example a video delivery system is known (for example, refer to PTL1) that employs program contents as videos, and that determines and records evaluations by viewers relating to the program contents on the basis of video photography of the viewers who are viewing the program contents.

CITATION LIST

Patent Literature

PTL1: JP2015-142207A.

SUMMARY OF INVENTION

Technical Problem

With the system of PTL1, evaluations by viewers (i.e. by users) relating to videos are managed. On the other hand, sometimes comments may be added to videos of this type by the users. Furthermore, sometimes stamps (which are one type of icon) that are prepared in advance and that correspond to emotions of various types may be employed as comments of this type. In such cases, it is possible to anticipate promotion of the use of comments (i.e. of stamps), since such selection of stamps enables easy addition of comments. However it may be difficult to reflect the individuality of the users in the comments, since the stamps are used in common by the various users. As a result, even if a large number of comments have been attached by various different users, this may not be any different from the case in which a large number of comments have been attached by the same user, so that it is possible that the beneficial effects of attachment of comments by many users are not sufficiently realized.

Accordingly, an object of the present invention is to provide a server device and so on, that is capable of making it easy to attach comments to videos while reflecting the individuality of various users.

Solution to Technical Problem

The server device of the present invention is a server device that comprises a computer having a video data storage unit that stores video data for displaying videos, and that, when a video display terminal that displays a video on the basis of the video data is connected via a network, delivers the video data to the video display terminal according to a request by the video display terminal, wherein the computer serves as: a comment specification unit that specifies a selected comment corresponding to a comment selected by each user from among a plurality of comment candidates that have been prepared in advance for attachment to the video; a symbol specification unit that, on the basis of symbol data that manages symbols that are set separately for each user in order visually to identify each user, specifies a user symbol corresponding to a symbol of the user who has selected the selected comment; and an information provision unit that, when a request is made for delivery of the video data, provides information specifying the selected comment and the user symbol to the video display terminal, so that a comment icon in which the selected comment and the user symbol are combined is attached to the video.

On the other hand, a non-transitory computer readable storage medium of the present invention is a non-transitory computer readable storage medium storing a computer program that is adapted to cause the computer having the video data storage unit to function as the units of the server device described above.

DESCRIPTION OF EMBODIMENTS

Figure 1:
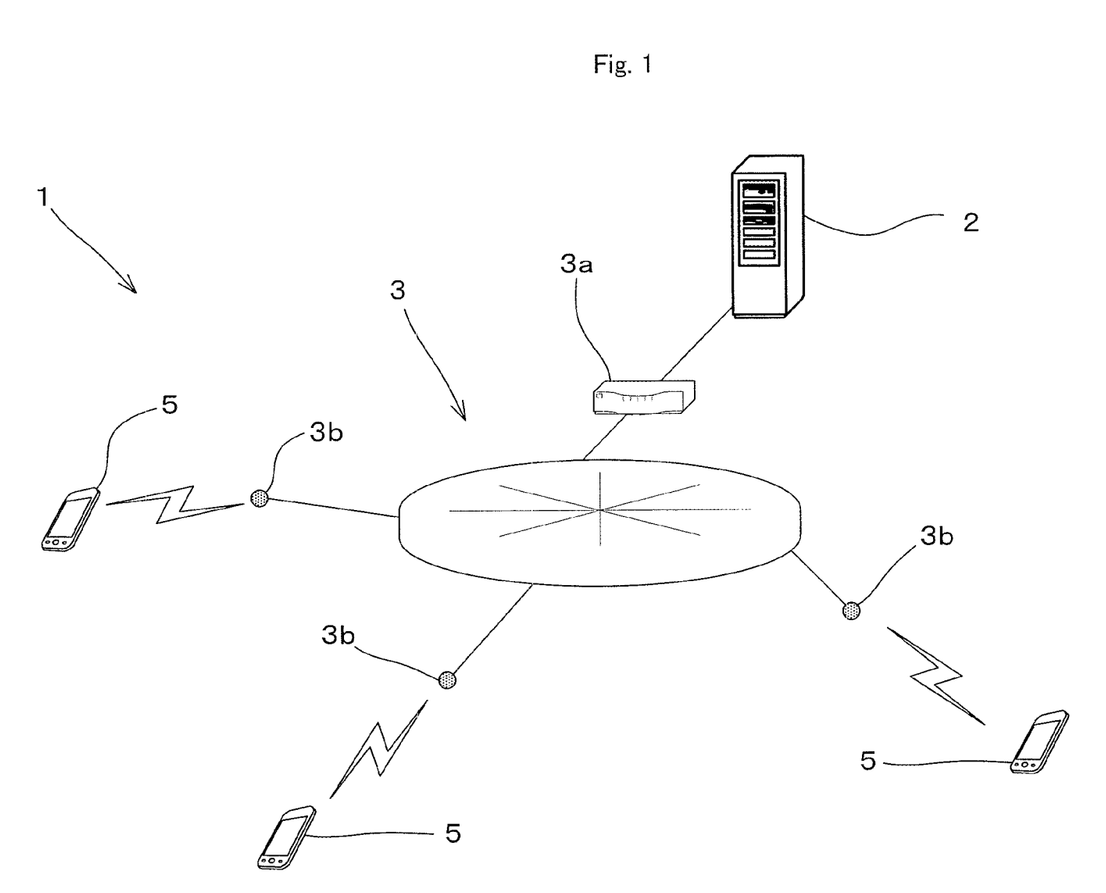
FIG. 1 is a figure showing a summary of the overall structure of a video delivery system according to an embodiment of the present invention.

In the following, a video delivery system according to an embodiment of the present invention will be explained. FIG. 1 is a figure showing a summary of the overall structure of a video delivery system according to an embodiment of the present invention. As shown in FIG. 1, the video delivery system 1 includes a center server 2, which operates as a server device. The center server 2 is not limited to being an example consisting of a single physical device. For example, a single logical center server 2 may be constituted by a server group consisting of a plurality of physical devices. Moreover, the center server could also be constructed logically by employing cloud computing.

User terminals 5 are connected to the center server 2 via a network 3. The user terminals 5 are network terminal devices of types that are employed by users. For example, a portable telephone (including a smartphone) may be employed as a user terminal 5. A portable telephone is a type of user terminal that is provided for the individual personal use of a user. For example, a portable telephone may have a video replay function of displaying (i.e. of replaying) video. And a portable telephone may, for example, function as a video display terminal for displaying video via this type of video replay function. Moreover, a portable telephone may provide various other functions by executing software. For example, one such function may be a game machine function that enables the user to play a game. And a portable telephone may, for example, function as a game terminal that provides a game via a game machine function of this type. In other words, the user terminal 5 may, for example, function both as a video display terminal and as a game terminal. Incidentally, apart from the above, for example, network terminal devices of various types such as personal computers and portable type tablet terminal devices that can be connected to a network and that are provided for individual personal use of users may be employed as user terminals 5.

As one example, the network 3 may be configured to implement network communication by employing the TCP/IP protocol. Typically, the network 3 is built as a combination of the internet that serves as a WAN and an intranet that serves as a LAN. In the example of FIG. 1, the center server 2 is connected to the network 3 via a router 3a, and the user terminals 5 are connected to the network 3 via access points 3b.

Incidentally, the format of the network 3 is not limited to employment of the TCP/IP protocol. Systems of various types may be employed for the network 3, such as cabled communication circuits, wireless circuits (such as infrared communication or Near Field Communication, etc.), and so on.

Via the network 3, the center server 2 provides web services of various types to the users of the user terminals 5. A video delivery service for delivering videos to the user terminals 5 is included in the web services. Furthermore, a comment attachment service for users to attach comments to videos delivered via the video delivery service is included in the web services. For example, such a comment attachment service may be supplied as a part of the video delivery service. The details of the comment attachment service will be described hereinafter.

Incidentally, apart from the above, according to the functions of the user terminals 5, the web service may include other services of various types. For example, the web service may include an information service of providing information of various types related to videos or to games. And, for example, the web service may also include a distribution service of distributing data or software of various types to the user terminals 5 (including data updates and so on). Yet further, the web service may also include a community service of providing a place for transmission, exchange, sharing and so on of information by users, a service of assigning user IDs for identifying users, a matching service of matching between users when a plurality of users are playing a common game via the network 3, and so on.

Figure 2:
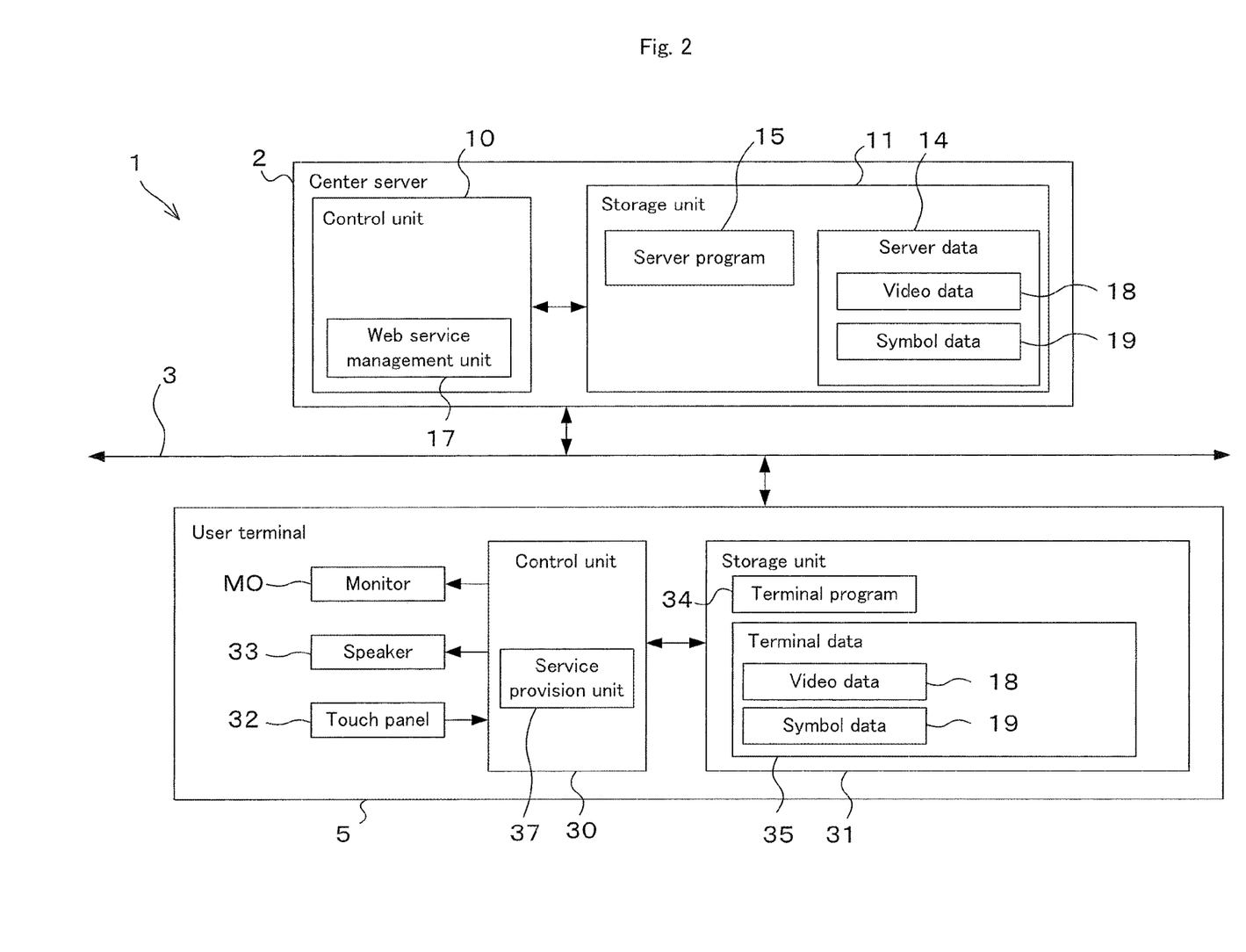
FIG. 2 is a figure showing the structure of principal portions of a control system of the video delivery system.

Next, principal portions of a control system of the video delivery system 1 will be explained. FIG. 2 is a figure showing the structure of principal portions of the control system of the video delivery system 1. As shown in FIG. 2, the center server 2 includes a control unit 10 which is embodied as a computer, and a storage unit 11. The control unit 10 is built as a computer unit in which are combined a microprocessor and peripheral devices of various types required for the operation of the microprocessor, such as internal storage devices (for example, a ROM and a RAM) and so on. Furthermore, input devices such as a keyboard and so on, and output devices such as a monitor and so on, may be connected to the control unit 10. However, these are not shown in the figures.

The storage unit 11 is connected to the control unit 10. The storage unit 11 may be built so as to be capable of maintaining storage even without supply of power, for example around a high capacity storage medium such as a magnetic tape or the like. Server data 14 and a server program 15 are stored in the storage unit 11. The server program 15 is a computer program that is required by the center server 2 for supplying services of various types to the user terminals 5. By the control unit 10 reading in and executing the server program 15, a web service management unit 17 is provided internally to the control unit 10.

The web service management unit 17 performs processing that is required for providing the web service mentioned above. The web service management unit 17 is a logical device that is implemented by a combination of computer hardware and a computer program. Moreover, apart from the above, logical devices of various other types may be provided internally to the control unit 10. However, such other devices are not shown in the figures.

The server data 14 is data that is referred to during execution of the server program 15. For example, the server data 14 may include video data 18 and symbol data 19. The video data 18 is data for displaying videos of various types. For example, a video associated with a game may be included in these videos. In more concrete terms, for example, the video data 18 may include data for displaying, as videos, transitions of the game screen during playing in the past of games provided by the user terminal 5. Moreover, the symbol data 19 is data for managing symbols that are provided individually for each user. The symbols are employed as information for visually identifying each user. The details of the video data 18 and the symbol data 19 will be described hereinafter.

Incidentally, for example, the server data 14 may include data of various types for web services. For example, as data of such types, apart from the above, the server data 14 may include ID management data for managing IDs of various types such as user IDs and so on. Moreover, for example, if the user terminal 5 is functioning as a game terminal, then the server data 14 may include play data for handing over unique information for each user, such as information specifying activity records related to the game and so on, including the results of playing the game in previous playing episodes up to the last (i.e. states of play in past games) to the next and subsequent playing episodes. However, such data is not shown in the figures.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is constructed as a computer unit in which a microprocessor and various peripheral devices such as internal storage devices (for example ROM and RAM) and so on that are required for the operation of this microprocessor are combined. Incidentally, apart from the above, for example, devices of various types that are required for replaying videos or providing games may be connected to the control unit 30. However, these are not shown in the figures.

The monitor MO is a conventionally known display device for displaying images of various types and so on based upon output signals from the control unit 30. As one example, according to output signals from the control unit 30, the monitor MO may display a video screen for displaying (viewing) videos. The touch panel 32 is a conventionally known input device that, when the user touches it with his or her finger or the like, outputs a signal corresponding to the position where it is being contacted. The touch panel 32 may, for example, be built to be transparent, and may be disposed by being superimposed upon the front surface of the monitor MO. And, on the basis of touch operation by the user, the touch panel 32 outputs a signal corresponding to the position where it is being touched to the control unit 30. In a similar manner, the speaker 33 is a conventionally known output device (i.e. an audio reproduction device) for reproducing audio of various types on the basis of output signals from the control unit 30. The speaker 33 reproduces audio of various types employed in videos or games, such as BGM (background music) and so on, according to output signals from the control unit 30.

On the other hand, the storage unit 31 may be built so as to be capable of maintaining storage even without supply of power; for example, it may be built around a magnetic recording medium, an optical recording medium, a flash SSD (Solid State Drive), or the like. A terminal program 34 and terminal data 35 are stored in the storage unit 31. The terminal program is a computer program that is required by the user terminal 5 for providing services of various types. For example, services of this sort may include replaying of videos and provision of games. A service provision unit 37 is provided internally to the control unit 30 by the control unit 30 executing the terminal program 34. The service provision unit 37 executes processing of various types required for provision of services such as replaying of videos, playing of games, and so on. The service provision unit 37 is a logical device that is implemented by a combination of computer hardware and a computer program. Incidentally, apart from the above, various logical devices of other types may be provided internally to the control unit 30. However, such other devices are not shown in the figures.

The terminal data 35 is data that is referred to as the terminal program 34 is executed. For example, the terminal data 35 may include the video data 18 and the symbol data 19. And, for example, at least parts of this data may be supplied from the center server 2, so as to include necessary portions thereof. Incidentally, apart from the above, the terminal data 35 may include data of various types for executing services of various types. For example, audio data for replaying audio of various types such as BGM (background music) or the like required for videos or for games, image data for displaying images of various types required for games, and ID management data such as described above, maybe included in data of this type. However, such other data is not shown in the figures.

Next, the details of the comment attachment service provided by the video delivery system 1 will be explained. As described above, the comment attachment service is a service for attaching comments by users (including various expressions such as characters and symbols) to videos. The comments by users are provided while being displayed in combination with symbols, in such a way that the supplier of each comment can be identified. In other words, the comment attachment service is adapted to display comments with symbols for identifying users. Moreover, a comment of this type with symbols appended may, for example, be managed by the center server 2 so that the comment is attached even when each video is being viewed by some other user. Alternatively, a comment of this type may be attached only during viewing by the user who has attached it. In this case, the information in a comment of this type may be managed by the user terminal 5. In other words, this type of comment information need not be transmitted to the center server 2.

Figure 3:
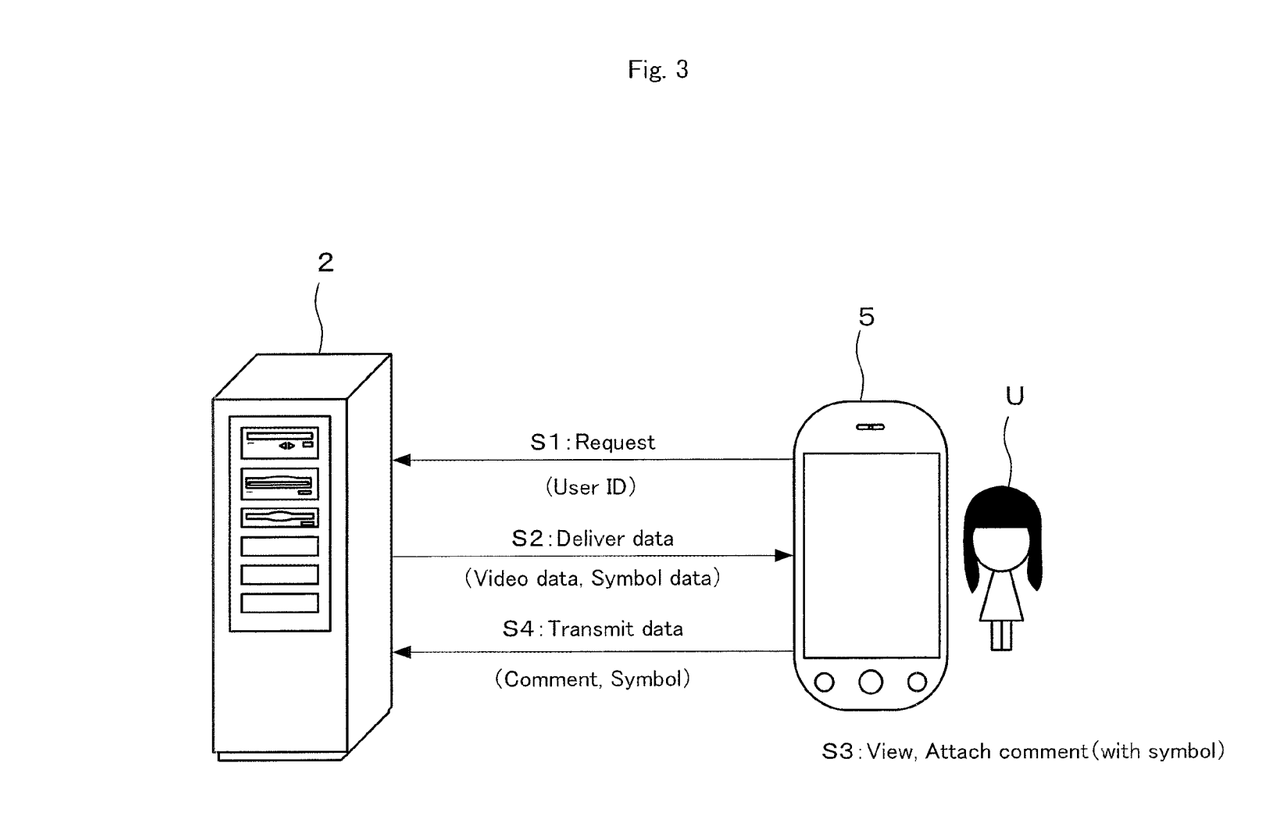
FIG. 3 is an explanatory figure for explanation of a summary of an example of a comment attachment service.

FIG. 3 is an explanatory figure for explanation of a summary of an example of the comment attachment service, when comments can be shared in common with other users. Furthermore, the example of FIG. 3 shows a case in which comments by users are attached during viewing of videos. In this case, as shown in FIG. 3, in the comment attachment service, when a video delivered via the center server 2 is being viewed via the user terminals 5, a comment with an appended symbol is attached to the video on each of the user terminals 5. And information specifying the comment with this type of symbol appended is transmitted to the center server 2, so as to be shared in common with the other user terminals 5. In other words, comments that are attached by each of the users U are also attached to the video as it is being viewed by other users U upon other user terminals 5, with symbols appended corresponding to that user U.

In concrete terms, in the comment attachment service, first, a user terminal 5 requests the center server 2 for a video to be the subject of delivery (S1). Moreover, this request is formulated so as to include a user ID, in order to identify the person making the request. For example, the user terminal 5 may make a request of this sort via a video application (software) for implementing the video replay function. Furthermore, for example, a web browser application (hereinafter sometimes termed a "web browser") may be employed as a video application of this type. In other words, in the comment attachment service, first, via a web application, a request is made to the center server 2 from a user terminal 5 for the subject to be delivered. Even further, a web application of this type may request a user ID for use in the request for delivery or in the application. And, via a web application of this sort, the user terminal 5 may make a request to the center server 2 so as to include the user ID corresponding to the user U who is the person making the request.

Next, in response to the request from the user terminal 5, the center server 2 delivers the data that is to be the subject of delivery to the user terminal 5 (S2). The data that is to be the subject of delivery includes the video data 18 for displaying the video that is the subject of the request, and also symbol data 19 for displaying the symbol of the person making the request. In more concrete terms, the center server 2 specifies the person making the request on the basis of a user ID included in the request from the user terminal 5. And, along with the video data 18, the center server 2 transmits the symbol data 19 to the user terminal 5 as data for the subject to be delivered, so that information specifying the symbol of the person making the request is included. Incidentally, the transmission of the symbol data 19 and so on may be performed at an appropriate timing. For example, the symbol may be displayed in various places upon the screen of the web application, as well as the video. In this case, the symbol data 19 may be transmitted at a timing that is appropriate to enabling it to be displayed in these various places (for example at the time of log-in or the like).

Next, on the basis of the video data 18 and the symbol data 19 that have been received from the center server 2, the user terminal 5 displays the video with the symbol and the comment attached thereto, and also provides each user U with an attachment opportunity for attaching an additional comment to the video (S3). In concrete terms, the user terminals 5 provide attachment opportunities of this type while the video is being viewed. Moreover, based upon the symbol data 19, the user terminals 5 combine symbols indicating the users U who have attached the comments, with the comments that have been accepted in this manner.

And the user terminals 5 manage the comments so that comments with symbols of this sort attached are displayed upon the video as additions.

For example, a comment of this type may be attached by selecting from a plurality of comment candidates that have been prepared in advance. And a comment icon that is a combination of a comment selected from a plurality of comments and a symbol may be attached (added) by each user to each of the videos, as appropriate. Moreover, for example, a web application may be employed for providing attachment opportunities of this sort. Furthermore, stamps for visually expressing emotions of various sorts (i.e. icons of a kind that is specialized for communication) may be employed as comment candidates of this type. In other words, a comment icon that is a combination of a stamp and a symbol may be attached via a web application, for example. Yet further, so that the users are identified by attaching such the comment icon, information related to opinions or emotions or the like of users U may be displayed during viewing of the video.

Moreover, the user terminal 5 transmits to the center server 2 data for displaying the comments that have been attached by the users U to the video (S4). In other words, in order to display comments that have been inserted by other users U along with viewing the same video, the user terminal 5 transmits data to the center server 2 for attaching the comments of those users U. In concrete terms, when a comment icon is attached to each video as a comment, the user terminal 5 transmits data to the center server 2, so as to include the comment (for example, a stamp) and symbol information for displaying this type of comment icon. For example, the comment attachment service may be provided in this manner.

Incidentally, comments attached by each of the users U may be added even when there is another user U who is viewing the same video at the same time, so as to be reflected in that video at the right opportunity. Alternatively, comments of this type may be attached to the video when the video is being viewed the next and subsequent times. For example, if a comment of this type is attached to the video when the video is being viewed the next and subsequent times, then it may be managed via the video data 18. Generation (or updating) of video data 18 of this type may be performed on the user terminal 5 side, or may be performed on the center server 2 side. In concrete terms, for example, in order immediately to reflect the result of attaching a comment in the video that is currently being viewed, video data 18 that includes an attachment result of this sort may first be generated by the user terminal 5. On the other hand, after the video data 18 has been transmitted by the user terminal 5, a video with comments affixed may be displayed on the basis of video data 18 transmitted from the center server 2. In other words, initial display of a comment for immediate reflection may be performed by the user terminal 5 without going via the center server 2, while on the other hand the subsequent display thereof may be performed on the basis of video data 18 sent via the center server 2.

Figure 4:
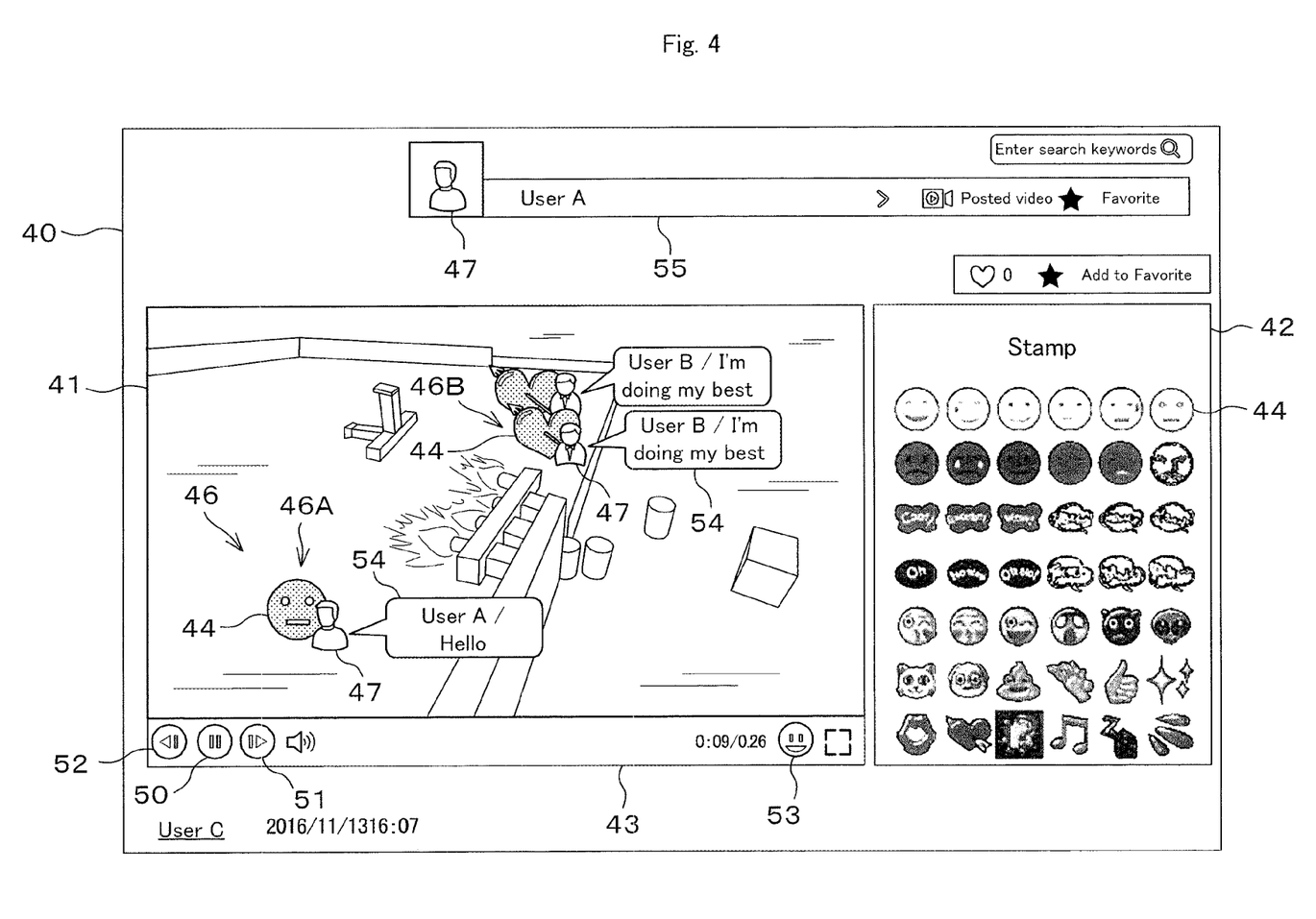
FIG. 4 is a figure schematically showing an example of a comment screen.

FIG. 4 is a figure schematically showing an example of a comment screen for implementing the attachment opportunity described above. This comment screen may, for example, be displayed upon the monitor MO of a user terminal 5 via a web application. And comments may be placed at any appropriate locations, provided that they are associated with the video. For example, comments may be placed in a region of the video that is separate from its display region, or may be placed in the display region of the video. The example of FIG. 4 shows a comment screen when, via comment icons, comments are attached in the display region of a video. In this case, as shown in FIG. 4, the comment screen 40 includes a video screen 41, a comment candidate region 42, and a viewing control region 43.

The comment candidate region 42 is a region for displaying a plurality of comment candidates that have been prepared in advance. Each of the comment candidates in the comment candidate region 42 functions as an option for selecting a comment to be attached to the video. For example, as comment candidates of this type, a plurality of stamps 44 may be displayed in the comment candidate region 42, and these stamps 44 may function as emoticons corresponding to expression of emotions of various kinds and so on. And, via designation by each user U, any one of these stamps 44 may be selectively employed.

The video screen 41 is a region for displaying (i.e. viewing) the video. Comment icons 46 that have been attached by various users U are displayed upon the video screen 41, as appropriate. Moreover, the video screen 41 is also employed for designation of placement locations for newly placing comment icons 46 of this sort. In concrete terms, for example, first, a stamp 44 to be placed and the location where that stamp is to be placed are designated by touch actuation upon the stamps 44 in the comment candidate region 42 and upon the video screen 41, respectively. In this case, following the selection of a stamp 44 to be placed, the position where it is to be placed may be designated immediately thereafter. In other words, the selection of the stamp 44 to be placed may be maintained until some other stamp 44 is selected. Alternatively, the stamp 44 to be placed and the location where it is to be placed may be designated by dragging and dropping a stamp 44 in the comment candidate region 42 to an appropriate location upon the video screen 41. Furthermore, taking this arrangement as reference, a symbol 47 may be disposed so as to be in a predetermined positional relationship with the stamp 44. And a comment icon 46 may be formed by a positional relationship (i.e. by a combination) of this sort between a stamp 44 and a symbol 47. For example, if a user ID is inputted when the web application is employed, then the corresponding symbol 47 may be placed automatically by the web application. Alternatively, the order in which the stamp 44 and the symbol 47 are placed may be reversed. And, for example, in a procedure of this sort, the video screen 41 may be employed for designation of the configuration of the new comment icon 46, and for designation of the location where it is to be placed.

The viewing control region 43 is a region for controlling viewing of the video that is being displayed via the video screen 41. In concrete terms, the viewing control region 43 includes a replay button 50, a fast forward button 51, a rewind button 52, and a comment control button 53. The fast forward button 51 and the rewind button 52 are respectively buttons for fast forwarding or for rewinding the video that is being displayed via the video screen 41. In a similar manner, the replay button 50 is a button for replaying or for stopping the video. For example, the replay button 50 may function as a stop button during replaying, and as a replay button during stopping, respectively. Moreover, the procedure described above of designating a placement location where the comment icon 46 is to be placed and so on may, for example, be executed while replaying of the video is stopped. As a result, the replay button 50 may function as a placing button for placing the comment icon 46. On the other hand, the comment control button 53 is a button for controlling whether or not the comment is to be displayed.

In the example of FIG. 4, the video screen 41 during replaying of a video is shown. For this reason, the replay button 50 is displayed so as to illustrate its function as a stop button. In a similar manner, the comment control button 53 is displayed in the state in which comments are displayed. Due to this, three comment icons 46 are displayed upon the video screen 41. In concrete terms, a common symbol 47 is employed in two of these comment icons 46, and the symbol 47 that is employed in the other one comment icon 46 (sometimes hereinafter this is termed the "first comment icon 46A") is different. Moreover, user information fields 54 specifying the relevant users U are attached to these comment icons 46. The user information fields 54 are regions for displaying information specifying the users U corresponding to the various comment icons 46. Apart from this information specifying the users U, appropriate information specifying a short comment and/or a simple profile may be displayed in the user information fields 54. Furthermore, a viewer information field 55 is provided at the upper portion of the video screen 41. The viewer information field 55 is a region for displaying information specifying the user U who is viewing the video screen 41. The information "User A" is displayed in the viewer information field 55 as information specifying the user U who is viewing, in other words specifying the user U who is using the web application. Moreover, next to the viewer information field 55, a symbol 47 is also displayed corresponding to the user U who is viewing the video screen 41, in other words corresponding to "user A".

In the example of FIG. 4, the information "User B/I'm doing my best" (information specifying the user, and a short comment) is displayed in the user information fields 54 of the two comment icons 46, among the three comment icons 46, that have the common symbol 47 (sometimes hereinafter these are termed the "second comment icons 46B"). These are comment icons 46 that have been attached by other common users U. These second comment icons 46B are automatically displayed as the video is viewed. On the other hand, the information "User A/Hello" is displayed in the user information field 54 of the first comment icon 46A. This is a comment icon 46 that has newly been attached at this time by the user U who is viewing the video via the video screen 41. As one example, the first comment icon 46A of the present user may be distinguished from the second comment icons 46B of other users U in this manner. For example, a comment attachment service may be provided via a comment screen 40 of this type. Moreover, in the example of FIG. 4, the stamp 44 and the symbol 47 that constitute the first comment icon 46A function as the selected comment of the present invention and as the user symbol of the present invention.

Incidentally, the web application may further be adapted to supply a symbol setting screen (not shown in the figures). And a unique symbol 47 may be set for each user U via a symbol setting screen of this type. This sort of symbol setting screen may be supplied before the video is viewed (including after viewing the video this time and before viewing the video next time), or may be supplied during viewing of the video. Moreover, as examples of supplying the symbol setting screen during viewing, the screen may be supplied when selection of the stamp is performed, or when the location at which it is to be placed is selected, or the like. In this case, the comment screen 40 may also function as a symbol setting screen. On the other hand, candidates for the symbols to be set individually for each of the users U may be prepared in advance, or may be provided by each of the users U. In other words, a unique image or the like that is supplied from each user U may be employed as the symbol 47 of that user. Furthermore, the comments that are displayed upon the video screen 41 may be restricted on the basis of some predetermined limiting condition. For example, whether or not a symbol 47 is present may be employed as such a limiting condition. In concrete terms, for example, the video screen 41 may permit the display of comments with symbols 47 attached, while restricting the display of comments to which no symbols 47 are attached. In other words, the video screen 41 may restrict the display of comments to the comment icons 46.

Figure 5:
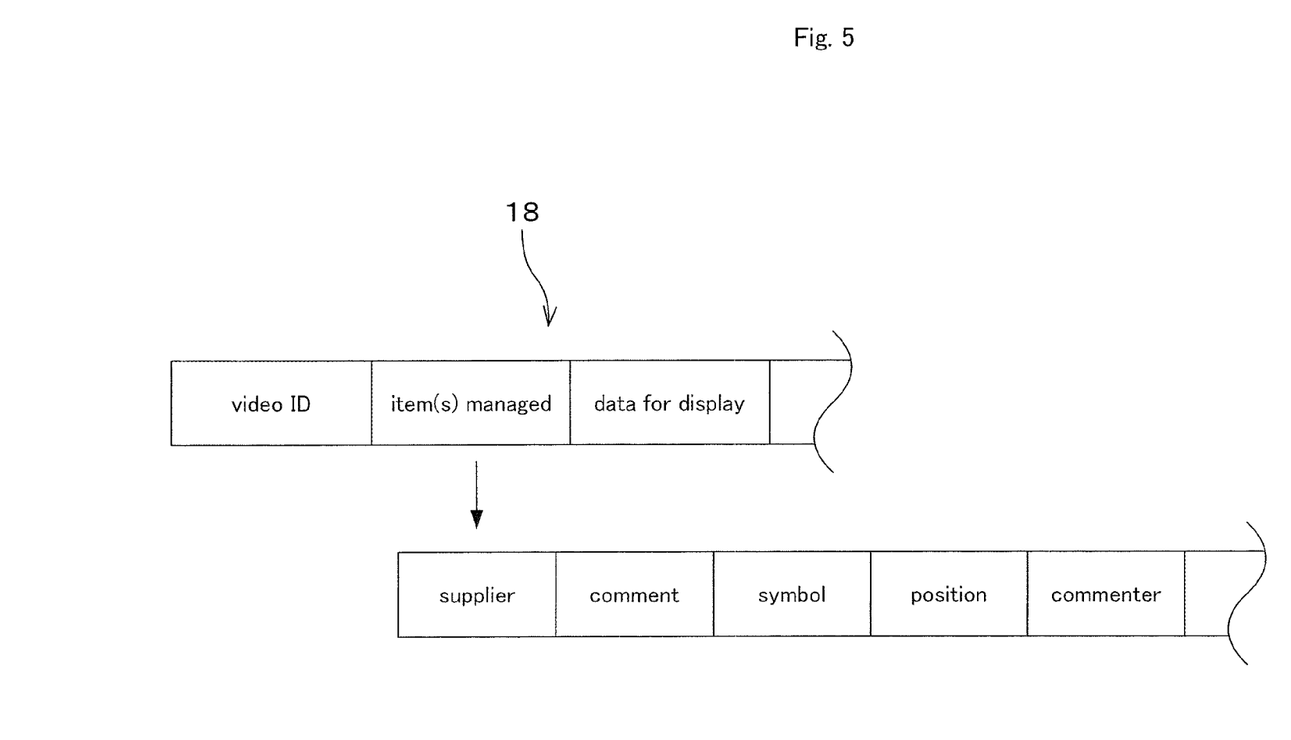
FIG. 5 is an explanatory figure for explanation of an example of contents of video data.

Next, the details of the video data 18 and the symbol data 19 will be explained. FIG. 5 is an explanatory figure for explanation of an example of the contents of the video data 18. Moreover, the example of FIG. 5 shows a case in which the video data 18 is employed for management of the comments. In this case, as shown in FIG. 5, the video data 18 may for example include the information items "video ID", "item(s) managed", and "data for display". And the video data 18 may, for example, consist of a set of records that are structured so that these information items are mutually associated.

"Video ID" is an information item for identifying each video. Information specifying a unique video ID for each video may, for example, be employed as "video ID". Moreover, "data for display" is data (for example MPEG standard data) that is required for displaying each video upon the monitor MO. On the other hand, "item(s) managed" is information for managing the videos. For example, "item(s) managed" may include the information items "supplier", "comment", "symbol", "position", and "commenter".

The items "supplier" and "commenter" are information respectively specifying the user U who has supplied each video and the user U who has attached the comment. For example, information specifying the user ID corresponding to the user U who uploaded each video, or the user U who attached the comment, may be employed as the information items "supplier" or "commenter". And "comment" is an information item specifying the contents of the comment attached to each video. For example, if stamps 44 are employed as comments, then unique stamp ID information for each stamp 44 may be described in "comment" for identifying each stamp 44. Furthermore, "comment" may also include information specifying the insertion position where each comment must be inserted into the video being replayed (for example, the elapsed time from the start of replaying, or the like). Moreover, "symbol" is information specifying the symbol 47 of the user U who attached the comment. In more concrete terms, when a comment icon 46 is attached to a video as a comment, information specifying the symbol 47 that should constitute the comment icon 46 is described as "symbol". For example, in "symbol", information specifying a unique symbol ID for each symbol 47 may be described as information of this type for identifying each symbol. And "position" is information that is used when the comment is being displayed upon the video screen 41. Information specifying the location at which the comment icon 46 is to be placed upon the video screen 41 is described in "position". Incidentally, for example, information for a plurality of "comments" or the like may be associated with the information "supplier". In this case, information specifying the plurality of comments or the like may be described in "comment" or the like.

Figure 6:
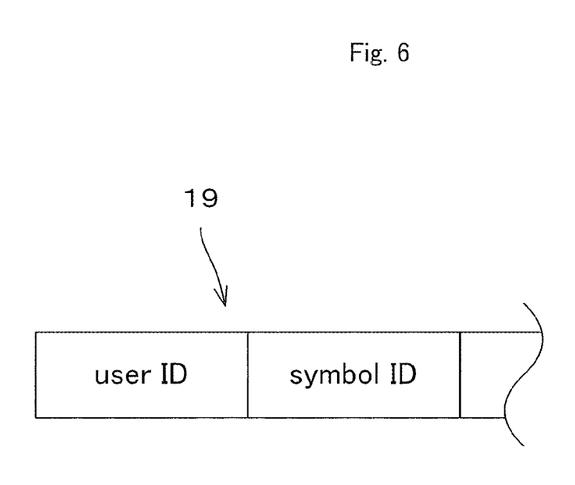
FIG. 6 is an explanatory figure for explanation of an example of contents of symbol data.

On the other hand, FIG. 6 is an explanatory figure for explanation of an example of the contents of the symbol data 19. As shown in FIG. 6, for example, the symbol data 19 may include information items "user ID" and "symbol ID".

"User ID" is information specifying a user ID for identifying each of the users U. And "symbol ID" is information specifying a symbol ID for identifying each of the symbols 47. The symbol data 19 may, for example, be structured as a set of records in which these information items are described so as to be mutually associated with one another. Moreover, in a case of this type, the symbol data 19 may function as a portion of the ID management data.

Next, the comment attachment processing and the information supply processing will be explained. The comment attachment processing is processing for attaching a comment to a video. In concrete terms, the comment attachment processing may be executed for attaching a comment to a video by, for example, the process in the step S3 of the example of FIG. 3. And the information supply processing is processing for delivering to a user terminal 5 data relating to some subject, that is to be delivered according to a request. In concrete terms, the information supply processing may be executed by, for example, implementing the process in the step S4 of the example of FIG. 3.

Figure 7:
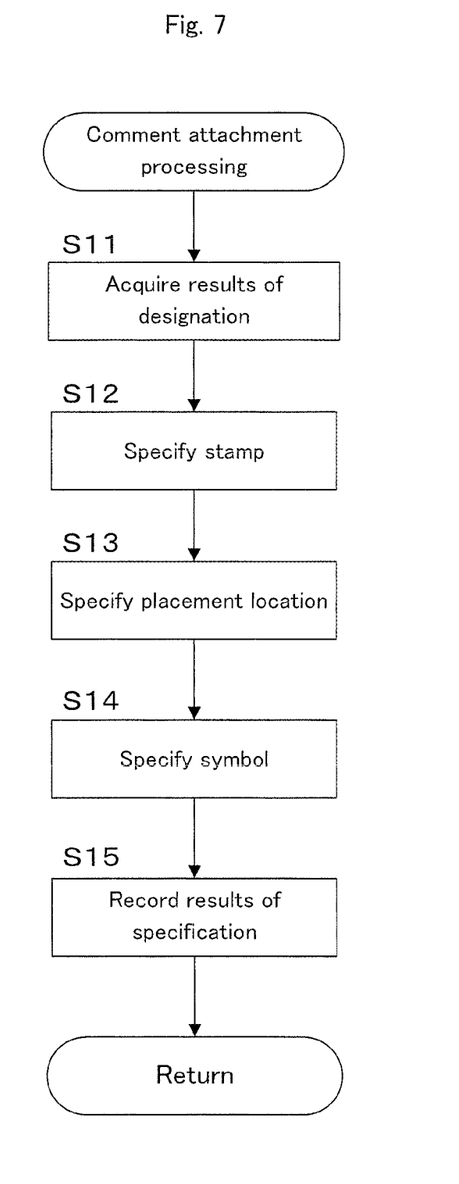
FIG. 7 is a figure showing an example of a flow chart of a comment attachment processing routine.
Figure 8:
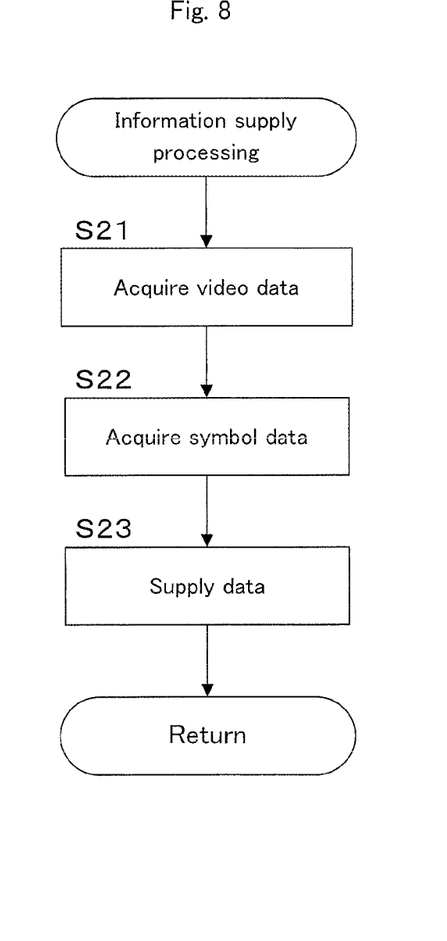
FIG. 8 is a figure showing an example of a flow chart of an information supply processing routine.

For example, the comment attachment processing and the information supply processing may be implemented by the control unit 10 of the center server 2 via the routine of FIG. 7 and the routine of FIG. 8 respectively. In more concrete terms, for example, the routines of FIG. 7 and FIG. 8 may be executed via the web service management unit 17 of the control unit 10. Incidentally, apart from the above processing, the control unit 10 of the center server 2 and the control units 30 of the user terminals 5 may execute conventional processing of various known types, either singly or in mutual cooperation. However detailed explanation thereof will be omitted.

FIG. 7 is a figure showing an example of a flow chart of a comment attachment processing routine for implementing the comment attachment processing. In more concrete terms, the example of FIG. 7 shows a flow chart when, on the basis of a command by each user U, a comment icon 46 that includes a stamp 44 is placed upon the video screen 41 as a comment. For example, the routine of FIG. 7 may be executed each time an attachment result is transmitted from a user terminal 5 when a comment is attached via the comment screen 40. Moreover, each time placement of a comment icon 46 is commanded via the comment screen 40, the user terminal 5 may, for example, transmit the result of this placement to the center server 2 as an attachment result. For example, the placement of a comment icon 46 may be commanded when a stamp 44 is dragged and dropped to a specified position. And the user terminal 5 may transmit the information of the stamp 44 which has been dragged and dropped, of the dropped position of the stamp, and of the user ID corresponding to the user U who has issued this command to the center server 2 as an attachment result.

When the routine of FIG. 7 is started, first in a step S11 the web service management unit 17 acquires the results of designation when comment attachment is designated by each user U. For example, the web service management unit 17 may acquire these designation results on the basis of attachment results transmitted from the user terminals 5.

Next in the step S12, on the basis of the designation result acquired in the step S11, the web service management unit 17 specifies the stamp 44 to be placed upon the video screen 41 from among a plurality of stamps 44 that have been prepared in advance. In a similar manner, in the next step S13, on the basis of the designation result acquired in the step S11, the web service management unit 17 specifies the location upon the video screen 41 for the stamp 44 to be placed. In concrete terms, for example, on the basis of information specifying a dropping location that is included in the attachment result transmitted from the user terminal 5, the web service management unit 17 may specify the location of this drop position as the location for placement.

Next in the step S14 the web service management unit 17 specifies the symbol 47 of the user U who ordered the placement (i.e. the insertion) of the stamp 44. This specification may, for example, be performed on the basis of the user ID information included in the attachment result transmitted from the user terminal 5. In concrete terms, in the step S14, the web service management unit 17 may specify the symbol 47 corresponding to the user ID included in the attachment result, on the basis of the symbol data 19.

And in the next step S15 the web service management unit 17 records the results of specification in the steps S12 through S14. In concrete terms, the web service management unit 17 may, for example, generate data for recording these specification results. If these specification results are managed with the video data 18, then the web service management unit 17 may update the video data 18 so that these specification results are recorded. Alternatively, these specification results may be recorded by generating new video data 18 for displaying the video with the comment icon 46 attached at the location where it is to be placed on the basis of these specification results. And, when the processing of the step S15 is completed, the web service management unit 17 terminates this iteration of the routine.

Comments that are to be attached to the video are managed by the routine of FIG. 7. In concrete terms, the stamps 44 to be attached, the locations in which they are to be placed, and the symbols 47 corresponding to the users U who have attached them are managed so that the stamps 44 with the symbols 47 attached by the users, in other words the comment icons 46 are displayed in the designated placement locations upon the video screen 41. Due to this, the stamps 44 are attached to the video so that their suppliers are identified via the symbols 47. As a result, for example, the processing for attachment of comments in the step S3 of the FIG. 3 example is implemented.

On the other hand, FIG. 8 is a figure showing an example of a flowchart of an information supply processing routine for implementing the information supply processing. Moreover, in a similar manner to the example of FIG. 7, the example of FIG. 8 shows a flow chart when a comment icon 46 is employed as a comment. The routine of FIG. 8 may, for example, be executed every time delivery of a video is requested from a user terminal When the routine of FIG. 8 is started, first in a step S21 the web service management unit 17 acquires the video data 18. In concrete terms, in the step S21, the web service management unit 17 acquires video data 18 for displaying a video corresponding to a request from a user terminal 5. Incidentally, if the comments and so on attached to videos are managed with data different from the video data 18, then in the step S21 the web service management unit 17 may further acquire other data of this type corresponding to the video that is the subject of the request.

Next in a step S22 the web service management unit 17 acquires symbol data 19. In concrete terms, the web service management unit acquires the symbol data 19 corresponding to the user U who has requested delivery of the video. For example, the user U who has requested delivery of the video may be specified on the basis of the user ID included in the request from the user terminal 5. And the web service management unit 17 may acquire the symbol data 19 so as to include a record of this specified user ID.

In the next step S23, the web service management unit 17 supplies (i.e. delivers) to the user terminal 5 the data that is to be delivered according to the request. In concrete terms, the web service management unit 17 supplies the video data 18 and the symbol data 19 specified in the steps S21 through S22 to the user terminal 5 as the data that is the subject for delivery. Furthermore, if the comment icon 46 to be attached to the videos and the location where it is to be placed are managed with the video data 18, then, along with delivering the video data 18, information relating to these is also supplied to the user terminal 5. And, for example, a comment icon 46 is attached to each video by the user terminal 5 on the basis of the video data 18. Alternatively, a video including a display of the comment icon 46 may be viewed on the basis of new video data to which the comment icon 46 is added. And, when the processing of the step S23 is completed, the web service management unit 17 terminates this iteration of the routine. Incidentally, if comment icons 46 and so on are managed with data that is different from the video data 18, then, as data to be the subject for delivery, the web service management unit 17 may further supply data of this different type to the user terminal 5 in the step S23.

The data required for displaying the requested video is delivered to the user terminal 5 by the routine of FIG. 8. Furthermore, if a comment is attached to this video, then information required for attaching this comment is also delivered. In concrete terms, information specifying the comment icon 46 to be placed on the video screen 41 and information specifying the location at which it is to be placed are supplied to the user terminal 5. And the video with the comment icon 46 attached is displayed via the user terminal 5 on the basis of information of this type. As a result, for example, the processing of the step S4 of the FIG. 3 example is implemented.

As explained above, according to this embodiment, a comment to be attached to the video is selected from a plurality of comment candidates that have been prepared in advance. Due to this it is possible to attach comments to the videos more easily, as compared to the case in which comments are freely inputted. Furthermore, symbols 47 for visually identifying the users U are combined with the comments attached to the videos. Due to this, via the symbols 47 of this type, it is possible to identify the users U who added the comments. And, due to this, it is possible to reflect the individuality of each of the users U in the comments, so that it is possible to achieve both ease of attaching comments to the videos and also reflecting the individuality of each of the users U. As a result, it is also possible to enhance the beneficial effect when comments have been attached by a large number of users, as compared to a case in which it is not possible to distinguish the user U who attached each comment.

In concrete terms, for example, if stamps 44 are employed as comment candidates, a stamp 44 (i.e. an expression of emotion) to be attached to a video is selected, from among the candidates for emotional expressions of various types. Due to this, along with it being possible to add the emotional expression of each user U to each of the videos relatively easily, also it is possible visually to identify the user U who has added this emotional expression. Since, as a result, it is possible to express the emotions of a large number of users U in relation to the video while identifying each of the users U, accordingly it is possible to enhance the beneficial effects of a large number of emotional expressions by a large number of users U.

In the above embodiment, by performing the routine of FIG. 7, the control unit 10 of the center server 2 functions as the comment specification unit, as the symbol specification unit, and as the information acquisition unit of the present invention. Moreover, in a similar manner, by performing the routine of FIG. 8, the control unit 10 of the center server 2 functions as the information provision unit of the present invention. On the other hand, by storing the video data 18, the storage unit 11 of the center server 2 functions as the video data storage unit of the present invention.

The present invention is not limited to the embodiment described above; it may be varied as appropriate. For example, in the embodiment described above, the user terminals 5 function both as video display terminals and as game terminals, according to differences in their software. However, the present invention is not limited to this type of format. For example, it may be arranged for the user terminals 5 to function either as video display terminals or as game terminals, according to differences in their hardware. In other words two separate user terminals 5, such as for example a personal computer and a tablet, may function as a video display terminal and as a game terminal, respectively. Furthermore, for example, apart from the user terminals 5, game machines for business use (i.e. for commercial use) that enable users to play games within a predetermined range for payment or without payment, and that thus serve as game terminals, may be connected to the center server 2 via the network 3. Moreover, in this case, game machines of this type may also be used as dedicated game terminals.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device of the present invention is a server device (2) that comprises a computer (10) having a video data storage unit (11) that stores video data (18) for displaying videos, and that, when a video display terminal (5) that displays a video on the basis of the video data is connected via a network (3), delivers the video data to the video display terminal according to a request by the video display terminal, wherein the computer serves as: a comment specification unit (10) that specifies a selected comment (44) corresponding to a comment selected by each user (U) from among a plurality of comment candidates (44) that have been prepared in advance for attachment to the video; a symbol specification unit (10) that, on the basis of symbol data (19) that manages symbols (47) that are set separately for each user in order visually to identify each user, specifies a user symbol corresponding to a symbol of the user who has selected the selected comment; and an information provision unit (10) that, when a request is made for delivery of the video data, provides information specifying the selected comment and the user symbol to the video display terminal, so that a comment icon (46) in which the selected comment and the user symbol are combined is attached to the video.

According to the present invention, a comment to be attached to the video is selected from among the plurality of comment candidates that have been prepared in advance. Due to this, it is possible easily to attach the comment to the video, as compared with a case in which comments are inputted freely. Moreover, a symbol for visually identifying each user is combined with the comment attached to the video. Due to this, it is possible to identify the user who attached the comment via a symbol of this type. And since, because of this, it is possible to reflect the individuality of each user in his or her comments, accordingly it is possible harmoniously to achieve both ease of attachment of comments to the videos, and reflecting the individuality of each user. As a result, it is possible to improve the beneficial effects when comments are attached by a large number of users.

The comments by each user may be attached to the videos in various different ways. For example, a comment may be displayed in a region that is different from the region in which the video is displayed, or may be displayed in the video display region. For example, as one aspect of the server device of the present invention, an aspect may be employed: in which there is further comprised an information acquisition unit (10) that, when the video is viewed via a video screen (41) displayed upon a display device (MO) equipped to the video display terminal, acquires information specifying a placement location at which the selected comment is to be placed on the video screen on the basis of designation of the user who selected the selected comment; and in which the information provision unit further provides information specifying the placement location to the video display terminal, so that the comment icon is placed at the placement location.

Furthermore, comments of various types may be prepared as a plurality of comment candidates. For example, as comment candidates, comments expressed by characters may be employed, or icons corresponding to images expressed by symbols or pictures may be employed. Moreover, if icons of this type are employed, then each icon may be used for objectives of various types. For example, in order to express emotions of various users about the videos, icons (for example, stamps) corresponding to emotions of various sorts may be employed as icons of this sort. In concrete terms, for example, in one aspect of the server device of the present invention, when a plurality of emoticons (44) for respectively visually expressing a plurality of emotions are employed as the plurality of comment candidates, the comment specification unit may specify, as the selected comment, a selected emoticon corresponding to the selected comment; and the information provision unit may provide information specifying the selected emoticon and the user symbol to the video display terminal, so that the comment icon is formed by a combination of the selected emoticon and the user symbol.

On the other hand, a non-transitory computer readable storage medium according to the present invention is a non-transitory computer readable storage medium storing a computer program that is adapted to cause the computer (10) having the video data storage unit to function as the units of the server device described above. By executing the computer program of the present invention, it is possible to implement the server device of the present invention.

The invention claimed is:

1. A server device that comprises a computer having a video data storage that stores video data for displaying videos, and that, when a video display terminal that displays a video based on the video data is connected via a network, delivers the video data to the video display terminal according to a request by the video display terminal, and wherein the computer comprises a microprocessor configured to:
specify a selected comment corresponding to a comment selected by each user from among a plurality of comment candidates that have been prepared in advance for attachment to the video;
based on symbol data that manages symbols that are set separately for each user in order visually to identify each user, specify a user symbol corresponding to a symbol of the user who has selected the selected comment;
when a request is made for delivery of the video data, provide information specifying the selected comment and the user symbol to the video display terminal, so that a comment icon in which the selected comment and the user symbol are combined is attached to the video; and
when the video is viewed via a video screen displayed upon a display device equipped to the video display terminal, acquire information specifying a placement location at which the selected comment is to be placed on the video screen based on a designation for an arbitrary location by the user who selected the selected comment,
wherein the microprocessor is further configured to provide the information specifying the placement location to the video display terminal, so that the comment icon is placed at the placement location,
when a plurality of emoticons for respectively visually expressing a plurality of emotions are employed as the plurality of comment candidates, the microprocessor specifies, as the selected comment, a selected emoticon corresponding to the selected comment, and provides information specifying the selected emoticon and the user symbol to the video display terminal, so that the comment icon is formed by a combination of the selected emoticon and the user symbol, wherein the combination of the selected emoticon and the user symbol of the comment icon is placed at the placement location and is separate from the video.

2. The server device according to claim 1, wherein in the comment icon, the user symbol overlaps at least a portion of the selected emoticon.

3. A non-transitory computer readable storage medium storing a computer program, when executed by the computer having a video data storage , causes the computer to perform the following operations:
specifying a selected comment corresponding to a comment selected by each user from among a plurality of comment candidates that have been prepared in advance for attachment to the video;
based on symbol data that manages symbols that are set separately for each user in order visually to identify each user, specifying a user symbol corresponding to a symbol of the user who has selected the selected comment;
when a request is made for delivery of the video data, providing information specifying the selected comment and the user symbol to the video display terminal, so that a comment icon in which the selected comment and the user symbol are combined is attached to the video; and
when the video is viewed via a video screen displayed upon a display device equipped to the video display terminal, acquiring information specifying a placement location at which the selected comment is to be placed on the video screen based on a designation for an arbitrary location by the user who selected the selected comment,
wherein the information is provided that specifies the placement location to the video display terminal, so that the comment icon is placed at the placement location,
when a plurality of emoticons for respectively visually expressing a plurality of emotions are employed as the plurality of comment candidates, a selected emoticon corresponding to the selected comment is specified as the selected comment, and information is provided that specifies the selected emoticon and the user symbol to the video display terminal, so that the comment icon is formed by a combination of the selected emoticon and the user symbol, wherein the combination of the selected emoticon and the user symbol of the comment icon is placed at the placement location and is separate from the video.

4. The server device according to claim 1, wherein the combination of the selected emoticon and the user symbol of the comment icon is placed on the video at the placement location.

5. The non-transitory computer readable storage medium according to claim 3, wherein the combination of the selected emoticon and the user symbol of the comment icon is placed on the video at the placement location.

6. The server device according to claim 1, wherein the combination of the selected emoticon and the user symbol of the comment icon is placed in a display region that is separate from a display region of the video.

7. The server device according to claim 1, wherein the combination of the selected emoticon and the user symbol of the comment icon is placed in a display region that is within a display region of the video.

8. The non-transitory computer readable storage medium according to claim 3, wherein in the comment icon, the user symbol overlaps at least a portion of the selected emoticon.

9. The non-transitory computer readable storage medium according to claim 3, wherein the combination of the selected emoticon and the user symbol of the comment icon is placed in a display region that is separate from a display region of the video.

10. The non-transitory computer readable storage medium according to claim 4 wherein the combination of the selected emoticon and the user symbol of the comment icon is placed in a display region that is within a display region of the video.

* * * * *